May 13, 1969
W. C. McMAHAN
3,443,420
IRRIGATION GAUGE
Filed May 19, 1967
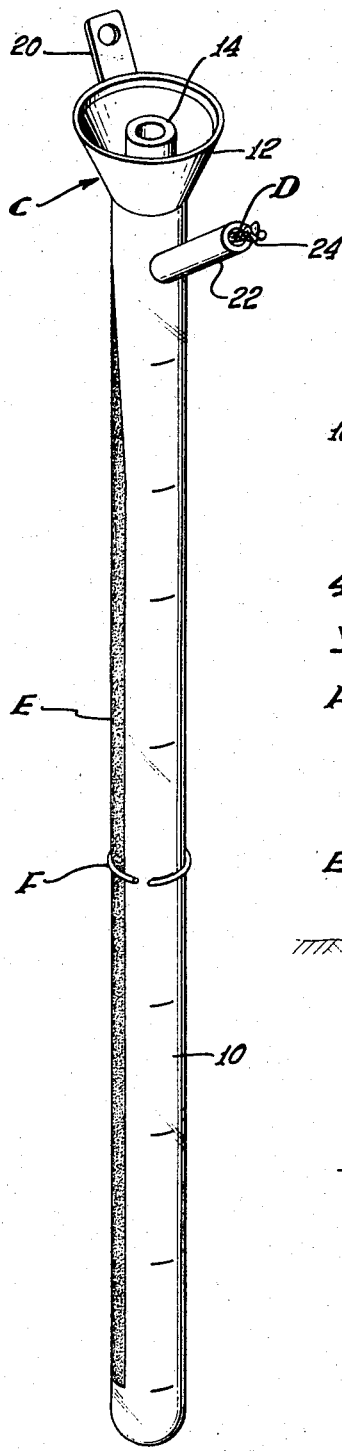
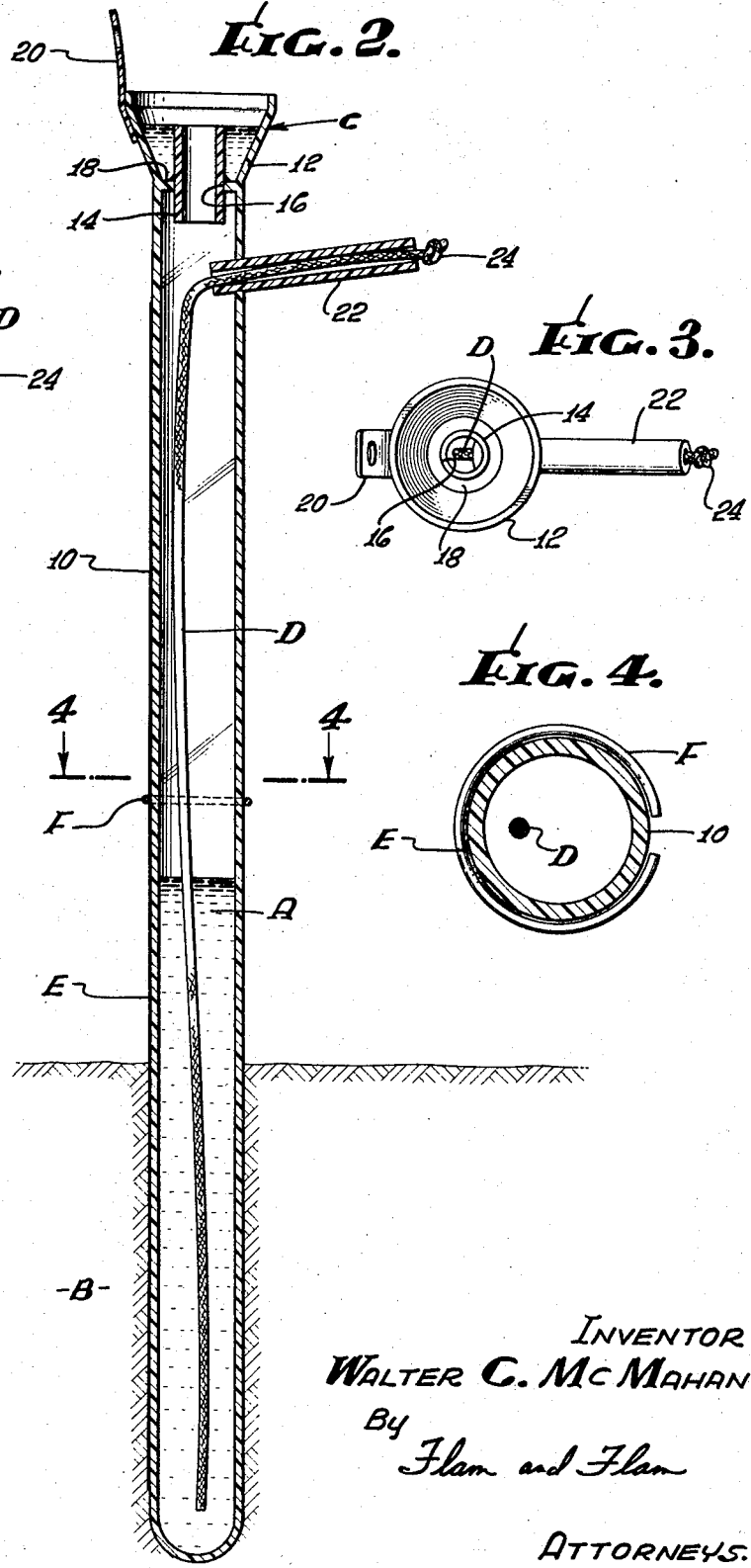
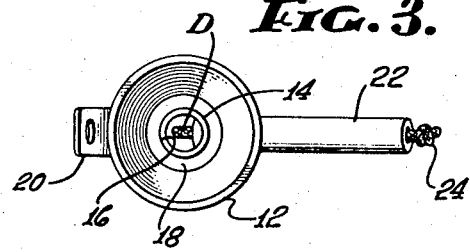
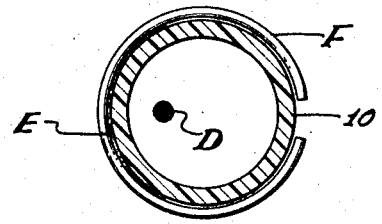
INVENTOR.
WALTER C. McMAHAN
By
Flam and Flam
ATTORNEYS.

United States Patent Office 3,443,420
Patented May 13, 1969

3,443,420
IRRIGATION GAUGE
Walter C. McMahan, Rte. 2, Box 2115,
Escondido, Calif. 92025
Filed May 19, 1967, Ser. No. 639,812
Int. Cl. G01f 23/02
U.S. Cl. 73—73                                    13 Claims

ABSTRACT OF THE DISCLOSURE

The level of water A in the gauge corresponds to the moisture content of surrounding ground. After irrigation or significant rainfall, the gauge is filled. Thereafter, it is subjected to the same forces of evaporation that affect the leaf surfaces of growing crops, thus reducing the moisture content of the surrounding ground. A cup C traps trace amounts of water that normally do not affect soil moisture content. A wick D is exposed to be subjected to ambient air conditions of relative humidity, wind, etc. One side of the gauge is painted as at E to assist moisture condensation for compensation purposes. A sildable indicator F signals the necessity of irrigation.

BRIEF SUMMARY OF INVENTION

This invention relates to moisture gauges for indicating the necessity of irrigation. A number of various devices have been heretofore designed for such purpose. The more accurate devices having dials, calibrating screws, etc., have required relatively frequent servicing. Hence, such devices are reliable only if the user has confidence that the device is in proper working condition and can detect, from a knowledge of the working of the apparatus, that it may be malfunctioning. In a large-scale farm or ranch operation, it is economically impractical to employ workers having adequate training for such purposes.

The primary object of this invention is to provide a moisture gauge that, despite its simplicity, is reliable and readable merely by noting the level of water in the gauge. Accordingly, simple and readily comprehensible instructions can be given by supervisory personnel to ranch or fram workers.

Another object of this invention is to provide a gauge of this character that responds in an accurate and compensating manner to rainfall, temperature, wind velocity, relative humidity, solar radiation and length of day. To respond to rainfall, the gauge has a receiver tube open at its upper end.

Another object of this invention is to provide a gauge of this character that for purposes of simplicity of operation, is simply filed to overflowing following a thorough irrigation and that is so designed that the level (absent rainfall) drops significantly for ease of reading. In order to accomplish this object, I provide a wick, one end of which is exposed laterally of its upper opening to the ambient air, and the other end of which is submerged in the water contained in the gauge. However, capillary attraction alone is quite inadequate uniformly to conduct moisture to the exposed wick end independently of the water level. Accordingly, a companion object of this invention is to provide means whereby moisture from the gauge is substantially uniformly conducted to the exposed end of the wick despite changes in water level.

Small amounts of rainfall may be entirely ineffective for irrigation, especially for relatively deep-rooted trees or plants. Accordingly, an object of this invention is to provide means for preventing trace or small amounts of rainfall from substantially changing the level of the gauge.

This invention possesses many other advantages and has other objects which may be made more clearly apparent from a consideration of one embodiment of the invention. For this purpose, there is shown a form in the drawings accompanying and forming a part of the present specification, and which drawings are true scale. This form will now be described in detail, illustrating the general principles of the invention; but it is to be understood that this detailed description is not to be taken in a limiting sense, since the scope of this invention is best defined by the appended claims.

BRIEF DESCRIPTION OF THE DRAWINGS

FIGURE 1 is a pictorial view of my irrigation gauge.
FIG. 2 is a longitudinal sectional view of the gauge inserted in the ground.
FIG. 3 is a top plan view of the gauge.
FIG. 4 is an enlarged transverse sectional view taken along a plane corresponding to line 4—4 of FIG. 2.

DETAILED DESCRIPTION

The gauge comprises an elongated tube 10 or column preferably made of transparent or translucent plastic material. The lower end of the column or tube 10 is closed, and at the upper end there is attached a substantially frustoconical receiver or cup 12. The upper end of the cup 12 is open to receive water, and its lower end communicates with the interior of the column or tube 10 via an overflow fitting 14. The fitting 14 is tubular and is supported intermediate its length at an aperture 16 in a wall 18 located at the juncture of the tube 10 and the cup 12. The tube 10, the cup 12, the tube 14 and the wall 18 may be fabricated and assembled in any suitable manner to constitute a unitary whole.

Wherever the moisture content of the surrounding ground is to be indicated, a gauge is located. The gauge may be suspended vertically by having its lower end inserted into the ground to B as shown in FIG. 2. Optionally, the gauge may be suspended by a tab or hanger 20 attached to the cup 12. Whatever method of suspension is used, a substantial length of the column or tube 10 is exposed to view so that the level of water A therein may be perceived.

Filling of the tube by either rainfall or sprinkler irrigation, acts as a signal thus preventing over irrigation. Thereafter, the moisture content of the surrounding soil normally reduces and the level of water A in the column 10 correspondingly lowers. For this purpose, the rate of evaporation of water at a wick D is affected by the same natural forces that affects the rate of transpiration of water through the leaves of the trees or growing crops, thus reducing the water content of the soil. The wick D has a relatively small diameter as compared with that of the column 10. It may be made of loosely braided nylon or other absorbent material. The lower end of the wick D projects substantially to the bottom of the column 10, and the upper end extends through an open ended lateral conduit 22. The conduit 22 inclines upwardly and projects through the side wall of the column 10 with one end inside the tube and spaced (more or less) from the opposite side of the column, and with its other end spaced outwardly from the column 10. The end of the wick D is knotted as at 24 to hold it in place.

When the water is at a level close to the top of the column 10, capillary action pulls moisture to the knotted end 24 of the wick D. Accordingly, since this knotted end 24 is exposed to the ambient air, it is subjected to forces of solar radiation, relative humidity and wind; at the same time, the column 10 itself is subject to ambient temperature and solar radiation. Water evaporates at a rate correlated to that at which it is drawn from the surrounding ground, and the level of liquid in the column 10 falls. However, in the event that there is rainfall, trace amounts will be trapped in the cup around the upper end of the fitting 14 and proportionately, very little will directly enter the fitting 14. More than trace amounts of rain will discharge into the tube 10 to provide corresponding compensation for the increased moisture content of the surrounding ground.

The height of the fitting 14 above the wall 18 may be determined according to the relative effect of small amounts of rainfall on the particular crop or vegetation. Thus, for deep-rooted trees, the position of the upper end of the tube 14 is relatively high. But, for relatively low-rooted plants or other vegetation, the position of the upper end of the tube 14 may be relatively low.

As the level of water recedes to a point marked by a resilient ring F, an indication is thereby given that the ground is in need of irrigation. This indication is independent of the number of days since the last irrigation. Accordingly, irrigation water is economically used.

As the water level falls from a high value, capillary action may be inadequate to draw moisture into the end of the wick D. In order to maintain the wick moist, the lateral tube 22 has a diameter only slightly in excess of that of the wick D in order to limit the free flow of air therethrough. Accordingly, since the inner end of the lateral conduit 22 is exposed in the column, moisture condenses in the lateral conduit 22 and maintains the wick moist. Additionally, to assist the condensation of moisture in the tube adjacent the wick D, the column 10 opposite the lateral conduit 22 is coated or painted as at E. Droplets, due to evaporation of the main column of water A, tend to accumulate along the inside of the column at the painted area E, and moisture is readily conducted to the tube 22 to hold the wick at the suitable level of saturation. Evaporation from the wick thus proceeds substantially uniformly as the level of liquid in the column recedes.

The ring F may be moved upwardly and downwardly, as may be determined by trial and error with the particular crop in question. Suitable guidelines or markings may be printed or etched on the tube for reference. The resilience of the ring F frictionally holds it in position.

I claim:

1. In an irrigation gauge: means forming a column for reception of water open at its upper end and closed at its lower end, said column being at least partially translucent for visual perception of the height of water in the column; a wick in the column having one end extending substantially to the bottom thereof and another end extending laterally outwardly of the column near the upper end thereof to leave said upper end of said opening unobstructed for entry of rain or irrigation water.

2. In an irrigation gauge: means forming a column for reception of water open at its upper end and closed at its lower end, said column being at least partially translucent for visual perception of the height of water in the column; a wick in the column having one end extending substantially to the bottom thereof and another end extending laterally outwardly of the column near the upper end thereof; a receiver cup attached to the upper end of the column, a transverse ported wall between the cup and the upper end of the column; and an overflow tube mounted at said ported wall and extending upwardly to a level beneath the top of the cup to trap about the conduit small amounts of precipitation.

3. In an irrigation gauge: means forming a column for reception of water open at its upper end and closed at its lower end, said column being at least partially translucent for visual perception of the height of water in the column; a wick in the column having one end extending substantially to the bottom thereof and another end extending laterally outwardly of the column near the upper end thereof; a lateral conduit projecting from the side of said gauge and through which said wick extends, said lateral conduit being angled upwardly so that its distal end is elevated relative to its place of attachment.

4. The combination as set forth in claim 3 in which said conduit has an internal diameter corresponding substantially to that of said wick whereby said wick is closely encompassed by said conduit to trap moisture therein.

5. The gauge as set forth in claim 2 together with a lateral conduit projecting from the side of said gauge and through which said wick extends, said lateral conduit being angled upwardly so that its distal end is elevated relative to its place of attachment.

6. The combination as set forth in claim 5 in which said conduit has an internal diameter corresponding substantially to that of said wick whereby said wick is closely encompassed by said conduit to trap moisture therein.

7. The combination as set forth in claim 1 together with a ring indicator slidably mounted on said column and frictionally held thereby in an adjusted position.

8. In an irrigation gauge: means forming a column for reception of water open at its upper end and closed at its lower end, said column being at least partially translucent for visual perception of the height of water in the column; a wick in the column having one end extending substantially to the bottom thereof and another end extending laterally outwardly of the column near the upper end thereof; one side of said gauge being provided with a darkened area for condensation of moisture along the column above the level of water therein and adjacent the upper end of said wick.

9. In an irrigation gauge: a tubular member made of translucent material having its lower end closed; a ported wall at the upper end of said tube; a conduit having an internal diameter substantially less than that of said tubular member and attached at said ported wall to form an inlet to said tubular member; a receiver cup attached to the upper end of said tubular member and surrounding said conduit to form a trap about said conduit, said cup having an upper opening substantially larger in area than said tubular member and located above the level of said conduit; a lateral conduit attached to the side of said tubular member adjacent the upper end thereof but beneath the said wall, said lateral conduit communicating with the interior of said tubular member and having a distal end open to the ambient air and located above its place of attachment to said tubular member; a wick threaded through said lateral conduit and into said column with one end located at the said distal end of said lateral conduit and the other end located adjacent the said closed end of said tubular member, said wick being closely circumscribed by said lateral conduit for trapping droplets of moisture therein; means providing a darkened area along the side of said column opposite said lateral conduit for condensation of moisture along the tubular member above the level of water in the tubular member; and a resilient ring frictionally gripping the exterior of the tubular member and slidable therealong to provide a level indicator.

10. The process of measuring the moisture exhaustion of surrounding ground by growing crops, which comprises: vertically orienting a tubular member adjacent the ground, the moisture content of which is to be indicated; filling the gauge with water upon complete irrigation of the surrounding ground; exposing the gauge to ambient temperature and to solar radiation; evaporating liquid from the gauge by the aid of a wick exposed at one end to the ambient air whereby a drop in level of liquid denotes the moisture removed from the ground by growing crops; conducting natural precipitation to the tubular member to add to the water content thereof; and trapping trace or small amounts of natural precipitation and preventing such trace or small amounts of natural precipitation from entering said tubular member.

11. The process of measuring the moisture exhaustion of surrounding ground by growing crops, which comprises: vertically orienting a tubular member adjacent the ground, the moisture content of which is to be indicated; filling the gauge with water upon complete irrigation of the surrounding ground; exposing the gauge to ambient temperature and to solar radiation; evaporating liquid from the gauge by the aid of a wick exposed at one end to the ambient air whereby a drop in level of liquid denotes the moisture removed from the ground by growing crops; and maintaining the wick moist as the level of water falls by trapping droplets of water around the upper end of the wick.

12. The process as set forth in claim 10, including the step of maintaining the wick moist as the level of water falls by trapping droplets of water around the upper end of the wick.

13. The process of measuring the moisture exhaustion of surrounding ground by growing crops, which comprises: vertically orienting a tubular member adjacent the ground, the moisture content of which is to be indicated; filling the gauge with water upon complete irrigation of the surrounding ground; exposing the gauge to ambient temperature and to solar radiation; evaporating liquid from the gauge by the aid of a wick exposed at one end to the ambient air whereby a drop in level of liquid denotes the moisture removed from the ground by growing crops; and maintaining the wick moist as the level of water falls by trapping droplets of water around the upper end of the wick by the provision of a restricted passage about the upper end of the wick and by the provision of a darkened area along the side of the tubular member adjacent the upper end of the wick.

References Cited

UNITED STATES PATENTS

| | | | |
|---|---|---|---|
| 1,126,968 | 2/1915 | Flint | 73—323 |
| 2,040,771 | 5/1936 | Heyroth | 73—338 |
| 3,048,032 | 8/1962 | Winter | 73—73 |

LOUIS R. PRINCE, *Primary Examiner.*

DENIS E. CORR, *Assistant Examiner.*